April 19, 1966     A. H. EL WAZIRI     3,247,364
APPARATUS FOR MEASURING TEMPERATURE DIFFERENCES
Filed Aug. 29, 1962     3 Sheets-Sheet 1
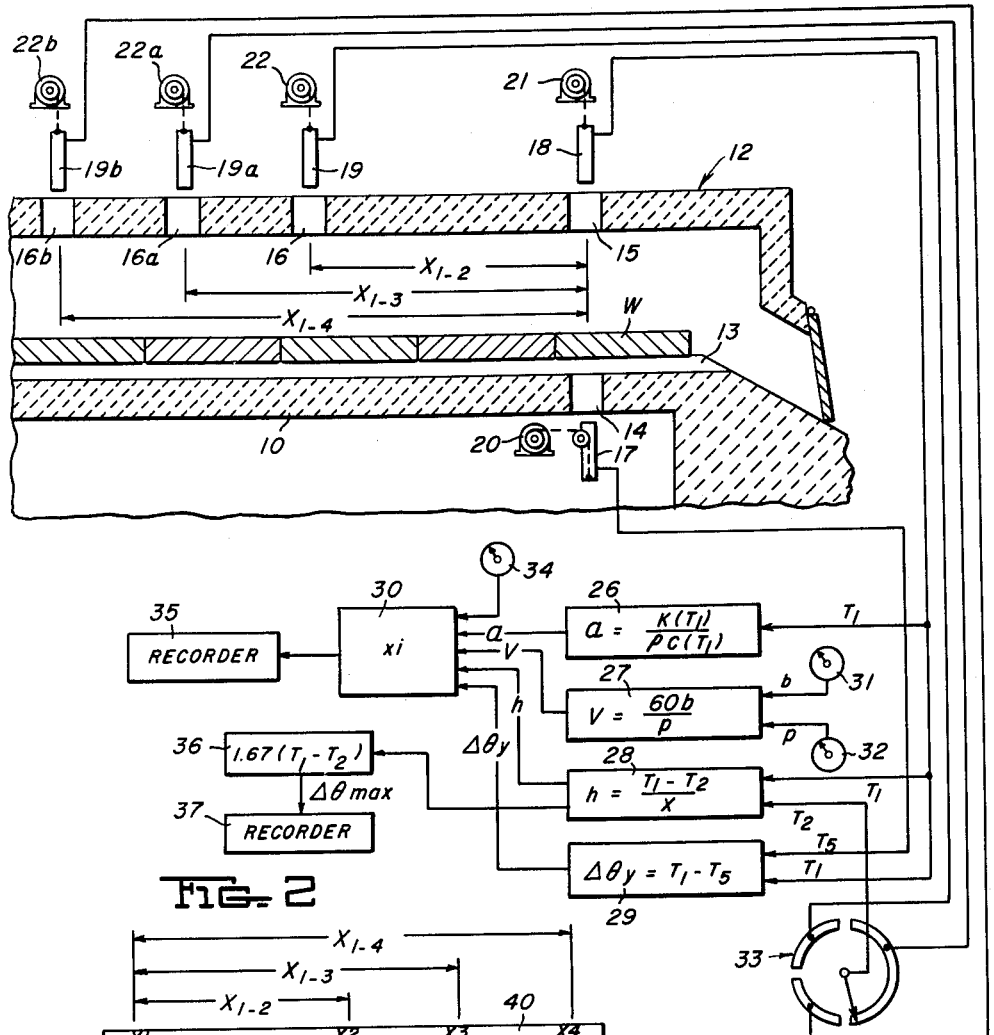
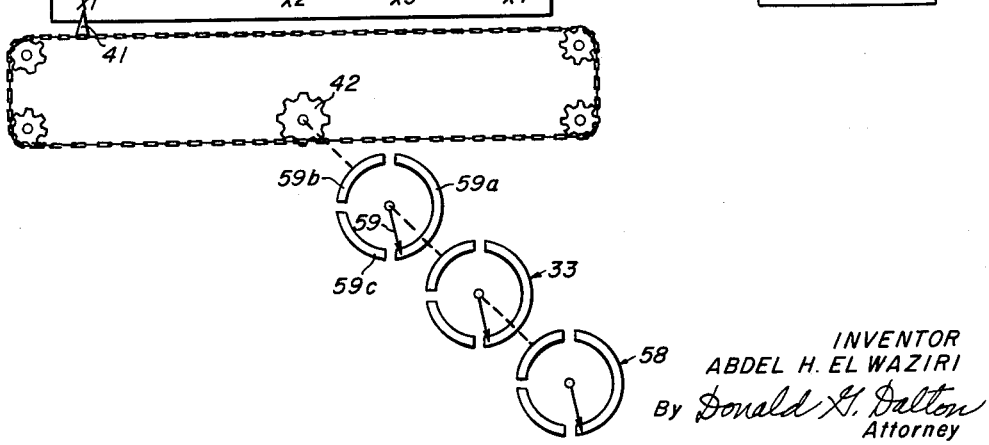
INVENTOR
ABDEL H. EL WAZIRI
By Donald G. Dalton
Attorney

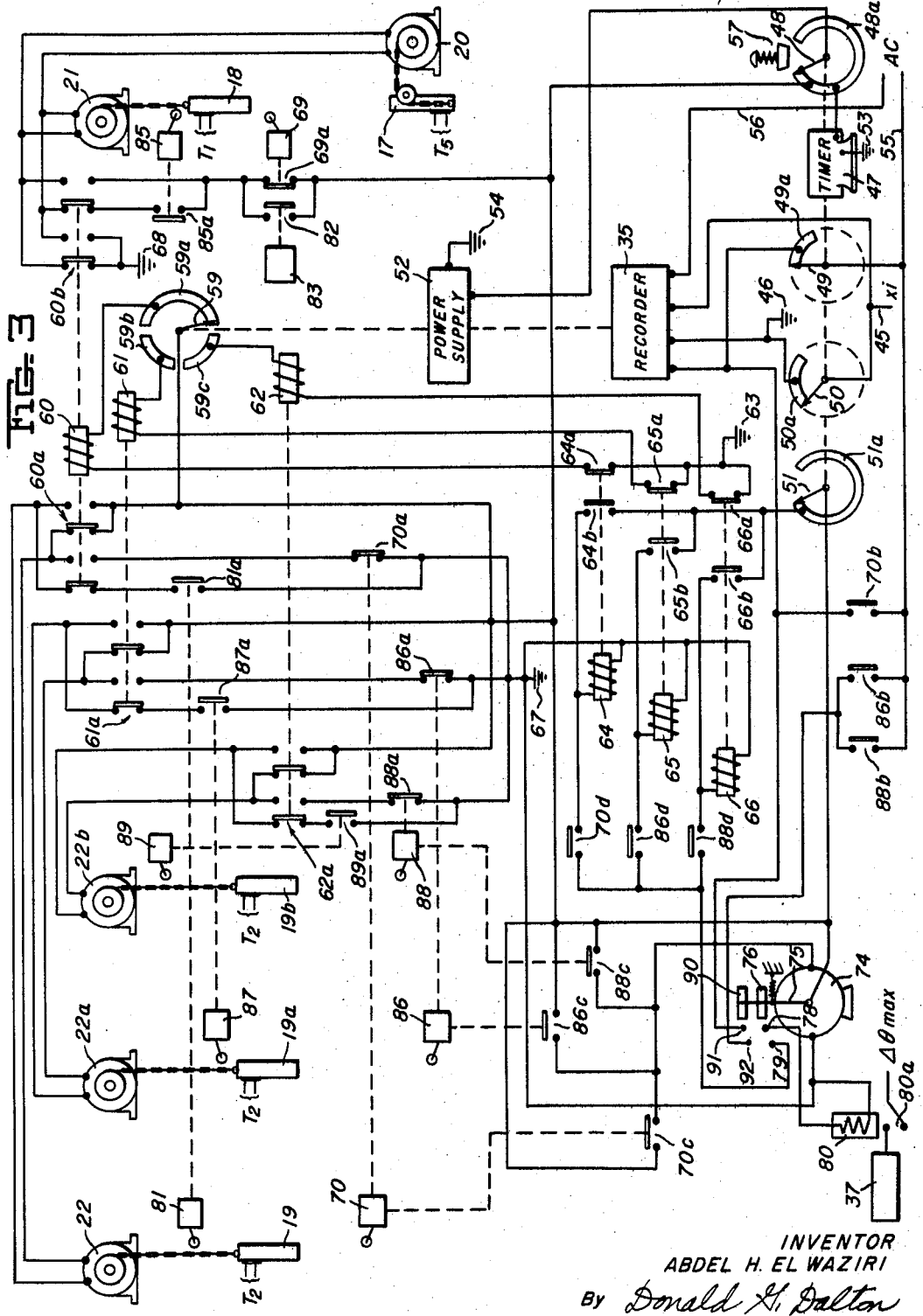

April 19, 1966     A. H. EL WAZIRI     3,247,364
APPARATUS FOR MEASURING TEMPERATURE DIFFERENCES
Filed Aug. 29, 1962     3 Sheets-Sheet 3

FIG. 4

INVENTOR
ABDEL H. EL WAZIRI
By Donald G. Dalton
Attorney

United States Patent Office 3,247,364
Patented Apr. 19, 1966

3,247,364
APPARATUS FOR MEASURING TEMPERATURE DIFFERENCES
Abdel H. El Waziri, Pittsburgh, Pa., assignor to United States Steel Corporation, a corporation of Delaware
Filed Aug. 29, 1962, Ser. No. 220,240
10 Claims. (Cl. 235—151.3)

This invention relates to an improved apparatus for measuring temperature differences.

Although my invention is not thus limited, the apparatus is particularly useful for measuring temperature differences between the hottest and coolest portions of semifinished metal workpieces (for example carbon steel slabs) leaving a continuous reheating furnace. The hottest portion of the work is at the surface which is exposed to flames in the furnace, but the coolest portion usually is beneath the surface where it is inaccessible for measuring its temperature directly. The temperature difference between these portions must be relatively small in order not to hamper subsequent operations on the workpiece (for example rolling). Hence the work must move through the furnace slowly enough that its interior is heated to a temperature which approaches the surface temperature. It is known that the difference in temperature between the hottest and coolest portions can be determined by calculation based on measurement of surface temperatures at spaced points, but as far as I am aware, there has been no practical apparatus for performing this calculation during actual operation of a furnace. The usual practice has been to operate such furnaces at rates which experience shows afford a satisfactory product without any actual measurement of temperature differences within the work. Nevertheless it is apparent my invention has broader application for measuring temperature differences between two points, one of which is inaccessible.

An object of my invention is to provide an improved apparatus for automatically measuring temperature differences between two points, one of which is inaccessible, by calculation based on temperature measurements at accessible points.

A further object is to provide an automatic apparatus for determining the degree of temperature uniformity in semi-finished metal workpieces leaving a reheating furnace, thereby enabling the furnace to be operated more efficiently and still furnish a satisfactory product.

A more specific object, as applied to a reheating furnace, is to provide a temperature measuring apparatus which locates a linear distance along the work where mathematical formulas for calculating differences are applicable, and determines an internal temperature within the work by measuring surface temperatures at the ends of this distance and calculating.

In the drawings:

FIGURE 1 is a diagrammatic longitudinal sectional view of a reheating furnace for steel slabs equipped with my temperature measuring apparatus;

FIGURE 2 is a schematic diagram of a portion of a recorder embodied in my apparatus;

FIGURE 3 is a schematic wiring diagram showing mainly the relays and switches embodied in my apparatus; and FIGURE 4 is a schematic diagram of the computer components embodied in my apparatus.

FIGURE 1 shows a portion of a conventional continuous reheating furnace adjacent the exit end, commonly known as the "soaking zone." The furnace includes a hearth 10, a roof 12, and skids 13. A continuous series of metal slabs W of similar thickness and similar material (for example carbon steel) are pushed through the furnace along the hearth and discharge one-by-one down the skids. The furnace of course has the usual burners, charging means and other conventional parts which I have not shown, since they are not involved in the present invention. The furnace heats the slabs as uniformly as possible to a suitable temperature for hot rolling, commonly in excess of 2000° F. in the example of carbon steel.

In accordance with my invention, hearth 10 and roof 12 have vertically aligned openings 14 and 15 immediately adjacent the discharge end of the hearth, and the roof has a series of openings 16, 16a and 16b spaced at different distances $X_{1-2}$, $X_{1-3}$ and $X_{1-4}$ from opening 15. I mount vertically movable temperature-sensing devices 17, 18, 19, 19a and 19b in alignment with the respective openings 14, 15, 16, 16a and 16b, and mechanically connect reversible electric motors 20, 21, 22, 22a and 22b with the respective temperature-sensing devices for projecting them through the openings into the furnace or withdrawing them. Each of the temperature-sensing devices preferably is in the form of an optical pyrometer. When any one of these devices is projected into the furnace, it develops a voltage signal proportional to the surface temperature of the work immediately adjacent thereto.

It is known that the net rate of heat flow in the surface of metal, such as carbon steel slabs, is an arbitrarily varying function along the length of the furnace. This function can be approximated by dividing it into a series of steps which represent different averages of the constant net rate of heat flow during the length of each step. During each operating cycle my apparatus first determines a linear distance Xi which starts at the temperature-sensing device 18 and extends along the upper surface of the work. This distance represents the minimum which must exist between the two points where I measure surface temperatures to obtain a reasonably accurate approximation of the internal temperature in my subsequent determinations. The magnitude of the distance Xi is determined by solving the formula:

$$Xi = 0.3\frac{VS^2}{\alpha}\left[\frac{\alpha\Delta\theta_y}{VS^2 h}+0.5\right]^2$$

where:

$V$ = average velocity of slabs in the furnace in feet per hour,
$S$ = slab thickness in feet,
$\alpha$ = thermal diffusivity of the work,
$h$ = temperature rise along the upper surface of the work in degrees F. per foot, and
$\Delta\theta_y$ = temperature difference between the upper and lower surfaces of the work at the exit end of the furnace.

$\alpha$, the thermal diffusivity, is determined by the formula:

$$\alpha = \frac{\text{conductivity}}{\text{density} \times \text{specific heat}}$$

For carbon steel at temperatures around 2000° F., $\alpha$ commonly is in the range of 0.2 to 0.3, but it varies with the temperature.

For determining Xi, my apparatus includes five computer circuits 26, 27, 28, 29 and 30. When the temperature-sensing device 18 is projected into the furnace, it feeds to circuit 26 a voltage signal $T_1$ proportional to the temperature at the upper surface of the work at the exit end of the furnace. Circuit 26 develops an output voltage signal proportional to $\alpha$, the thermal diffusivity of the work W at this temperature. On two set point indicators 31 and 32 I set the slab width $b$ in feet and the "period" $p$ in minutes (the time interval between feeding two successive slabs to the furnace). These indicators feed proportional voltage signals to circuit 27, which develops an output voltage signal proportional to V, the average velocity of the work through the furnace. When the temperature-sensing device 18 and one of the devices 19, 19a or 19b are projected into the furnace, the projected devices feed to circuit 28 voltage signals $T_1$ and $T_2$ respectively. Signal $T_2$ is proportional to the temperature at the upper surface of the work at a location spaced inwardly from the exit end. A selector switch 33 automatically connects the projected temperature-sensing devices 19, 19a or 19b with circuit 28, and disconnects the retracted devices therefrom. Circuit 28 develops an output voltage signal proportional to h, the temperature rise along the upper surface of the work. When the temperature-sensing devices 17 and 18 are projected into the furnace, they feed to circuit 29 voltages signals $T_1$ and $T_5$ respectively. Signal $T_5$ is proportional to the temperature at the bottom surface of the work at the exit end. Circuit 29 develops an output voltage signal proportional to $\Delta\theta_y$, the difference between the upper and lower surface temperatures of the work as it leaves the furnace. I connect the other four circuits 26, 27, 28 and 29 and a set point indicator 34 to circuit 30. On indicator 34 I set the slab thickness S in feet. Thus circuit 30 combines the foregoing factors to develop an output voltage signal proportional to the distance Xi, which signal goes to a record 35. One example of suitable components for the computer circuits is stated hereinafter.

As also hereinafter described, the apparatus first projects the three temperature-sensing devices 17, 18 and 19 into the furnace. If the recorder 35 shows that the computed distance Xi is less than or equal to the distance between the temperature-sensing devices 18 and 19, the apparatus utilizes the temperatures at 18 and 19 for the voltage signals $T_1$ and $T_2$ respectively. If the recorder shows the computed distance is greater than the distance between devices 18 and 19, the apparatus automatically withdraws 19 and projects 19a. If the recorder now shows Xi is less than or equal to the distance between the temperature-sensing devices 18 and 19a, the apparatus utilizes the temperature at 19a for $T_2$. Similarly if the computed distance is greater than the distance between devices 18 and 19a, the apparatus automatically withdraws 19a, projects 19b, and utilizes the temperature at 19b for $T_2$. Theoretically for greatest accuracy I would take $T_2$ at exactly the distance Xi from the temperature-sensing device 18. Since I can take $T_2$ only at the finite locations of the temperature-sensing devices 19, 19a or 19b, I use the device closest to 18, provided the distance is at least as great as the computed distance Xi.

After my apparatus determines which temperature-sensing device 19, 19a or 19b to use, it determines the temperature difference between the hottest and coolest portions of the work by solving a second formula:

$$\Delta\theta_{max} = 1.667(T_1 - T_2)$$

in which $\Delta\theta_{max}$ is the temperature difference. For this purpose I connect circuit 28 with another computer circuit 36 and thus feed to the latter circuit a voltage signal proportional to $(T_1 - T_2)$. Circuit 36 automatically multiplies this signal by a constant factor 1.667, and thus transmits a voltage signal which closely approximates $\Delta\theta_{max}$. I connect circuit 36 to a recorder 37, which indicates and records the value of $\Delta\theta_{max}$.

*Control circuit*

As shown in FIGURE 2, recorder 35 includes a scale 40, a pointer 41, and a drive 42 mechanically connected to the pointer for moving it along the scale. The scale is graduated proportionately to the linear spacing of the four temperature-sensing devices 18, 19, 19a and 19b, whereby the graduations represent the distances $X_{1-2}$, $X_{1-3}$, and $X_{1-4}$. As shown in FIGURE 3, conductors 45 and 46 extend from the computer circuit 30 to the control input terminals of the recorder to feed D.-C. voltage signals proportional to computed values of Xi. The circuit also includes a motor-driven timer 47 which turns in a clockwise direction and is mechanically connected to four rotary switch arms 48, 49, 50 and 51. These switches have contact segments 48a, 49a, 50a and 51a which the respective arms can engage. The motors and relays of my control circuit are energized from a D.-C. power supply 52. I connect one side of the power supply to arm 48 and connect segment 48a to one side of timer 47. The other sides of timer 47 and power supply 52 can be grounded, as indicated at 53 and 54. I supply power to the recorder via A.-C. lines 55 and 56, one of which goes through the switch 49, 49a. I connect arm 50 and segment 50a to the D.-C. conductors 45 and 46 respectively.

At the start of a measuring operation, each of the arms 48, 49, 50 and 51 is out of contact with its respective segment. Switch 48, 48a has a starting button 57, which I manually depress to establish initial contact between arm 48 and its segment 48a and thus complete a current path through timer 47. As soon as this timer commences to run, arms 48, 49 and 50 engage their segments, and after a delay arm 51 also engages its segment. Arm 48 and segment 48a maintain the current path through the timer through almost one complete revolution of the arm. Arm 49 and segment 49a complete a current path for supplying A.-C. power from lines 55 and 56 to recorder 35. Arm 50 and segment 50a temporarily short-circuit conductors 45 and 46 ahead of the control terminals of the recorder. Thus the drive 42 of the recorder moves pointer 41 back to a zero reading on scale 40 (FIGURE 2).

As shown in FIGURE 2, the recorder drive 42 also is mechanically connected to the aforementioned selector switch 33 and to the arms 58 and 59 of additional selector switches. Switch 58 is discussed later in connection with FIGURE 4. Switch 59 has three contact segments 59a, 59b and 59c which are engageable by the arm and are proportional in length to the distances $X_{1-2}$, $X_{1-3}$ and $X_{1-4}$ respectively. Switches 33 and 58 have similar arms and contact segments, not enumerated in detail. As shown in FIGURE 3, I connect the contact segment 48a to arm 59 and I connect the coils of three relays 60, 61 and 62 to the segments 59a, 59b and 59c respectively. The other ends of these coils I connect to a ground 63 via back contacts 64a, 65a and 66a respectively of relays 64, 65 and 66. I connect motors 22, 22a and 22b to the contact segment 48a and to a ground 67 via sets of reversing contacts 60a, 61a and 62a respectively of relays 60, 61 and 62. Likewise I connect both motors 20 and 21 to the contact segment 48a and to a ground 68 via a set of reversing contacts 60b of relay 60.

As the recorder drive 42 moves arm 59 across segments 59a, 59b and 59c, relays 60, 61 and 62 are energized and deenergized sequentially as the arm contacts and leaves each segment. When relay 60 is energized, its reversing contacts 60a and 60b change position and energize motors 20, 21 and 22 in a direction to project the temperature-sensing devices 17, 18 and 19 into the furnace. When the temperature-sensing devices 18 and 19 reach their fully projected positions, they trip lower limit switches 69 and 70 respectively. Limit switch 69 has a normally closed contact 69a in series with both motors 20 and 21, which stop when the switch is tripped. Limit switch 70 has a normally closed contact 70a and normally open contacts 70b, 70c and 70d. Contact 70a is in series with motor 22, which also stops when the switch is tripped. In the meantime arms 49 and 50 have moved past their contact segments 49a and 50a to disconnect the A.-C. line 55 from recorder 35 and to remove the short circuit across conductors 45 and 46. However contact 70b is in parallel with arm 49 and segment 49a. Thus the A.-C. lines 55 and 56 again energize the recorder when the limit switch 70 is tripped.

I connect the motor of a second timer 74 in series with contact 70c and thence to the contact segment 48a, and connect the other side of this motor to the ground 67. Timer 74 has an arm 75 which turns in a counterclockwise direction when the motor runs and returns to its starting position under spring action when the motor is deenergized. Arm 75 is connected to the contact segment 48a and itself carries a contact segment 76. As arm 75 moves counterclockwise, segment 76 successively engages two contact buttons 78 and 79. I connect button 78 to one end of the coil of a relay 80 and connect the other end of the relay coil to the ground 67. Relay 80 has a normally open contact 80a in series with recorder 37. If $Xi$ lies within the distance $X_{1-2}$, the recorder drive 42 stops while arm 59 still engages the first segment 59a. Timer 74 completes its cycle just described. Relay 80 is energized when segment 76 engages button 78, whereupon contact 80a closes and recorder 37 shows the desired value $\Delta\theta_{max}$.

I connect the other button 79 in series with contact 70d of limit switch 70 and the coil of relay 64, and connect the other end of the relay coil to the ground 67. After sufficient time for recorder 37 to act, segment 76 engages button 79, completing a current path through the coil of relay 64, since contact 70d already closed to condition the relay when the limit switch 70 was tripped. Relay 64 is energized and seals in via a contact 64b, which is connected to the contact segment 51a. By this time arm 51 has engaged segment 51a to provide a connection to the contact segment 48a. Contact 64a opens, whereupon relay 60 drops out. The reversing contacts 60a and 60b change position. Motor 22 runs in a direction to withdraw the temperature-sensing element 19. Limit switch 70 returns to its original position. Contact 70c opens and deenergizes timer 74, which resets under spring action, as already mentioned. When the temperature-sensing device 19 is fully withdrawn, it trips an upper limit switch 81 which has a normally open contact 81a in series with motor 22. When the temperature-sensing device 19 was projected into the furnace, this contact closed. Now when the limit switch is tripped as the device returns, this contact again opens to stop motor 22. Contacts 60b also reverse their positions, but since contact 69a remains open, motors 20 and 21 do not operate at this stage. I connect a second normally open contact 82 in parallel with contact 69a. After $\Delta\theta_{max}$ has been recorded, a timer 83 closes contact 82 temporarily and thus energizes motors 20 and 21 to withdraw the temperature-sensing devices 17 and 18. As soon as the device 18 clears limit switch 69, contact 69a closes to maintain a current path to motors 20 and 21 and thus continue the withdrawal of the devices 17 and 18. If there is no recording of $\Delta\theta_{max}$, these devices remain in their projected positions so that devices 19a and 19b may be subsequently employed. When the temperature-sensing device 18 is withdrawn, it trips an upper limit switch 85 and opens a contact 85a to stop motors 20 and 21. When arm 48 rides off contact segment 48a, timer 47 stops.

If $Xi$ lies beyond the distance $X_{1-2}$, the recorder drive 42 moves arm 59 off segment 59a before timer 74 moves segment 76 into engagement with button 78. Relay 60 drops out, the reversing contacts 60a change position, motor 22 runs in a direction to withdraw the temperature-sensing device 19, and limit switch 70 returns to its normal position. Contact 70c opens to deenergize timer 74 before it has completed its timing cycle, whereupon its arm 75 returns to its starting position. Thus relay 80 is not energized and recorder 37 does not act. When relay 61 is energized, a series of steps similar to those already described take place, but utilizing the temperature-sensing device 19a, motor 22a and relay 65. This temperature-sensing device has cooperating lower and upper limit switches 86 and 87 similar to the limit switches 70 and 81 associated with the temperature-sensing device 19. In like manner the temperature-sensing device 19b, motor 22b and relay 66 may act if $Xi$ lies beyond $X_{1-3}$. The temperature-sensing device 19b has cooperating lower and upper limit switches 88 and 89, similar to the others. The lower limit switches 86 and 88 have normally closed contacts 86a and 88a, and normally open contacts 86b, 86c, 86d, 88b, 88c and 88d which act in the same manner as corresponding contacts of limit switch 70. Likewise the upper limit switches 87 and 89 have normally open contacts 87a and 89a. Relays 65 and 66 have normally open contacts 65b and 66b through which they seal similar to relay 64.

In the event it is necessary to project one or both temperature-sensing devices 19a or 19b to locate $Xi$, I stop recorder 35 until the signal corresponding to $Xi$ fed to the recorder reaches its stable value. In this manner pointer 41 remains at a position beyond $X_2$ during the changeover and the buildup of signal $Xi$. For this purpose arm 75 of timer 74 carries a second contact segment 90 insulated from the arm, and the timer has cooperating buttons 91 and 92. These buttons are connected between contact 70b of the lower limit switch 70 and contact 86b of the lower limit switch 86. When the temperature-sensing device 70 is withdrawn and contact 70b opens, the A.-C. supply is cut off from recorder 35. The recorder is energized again when segment 90 completes a connection between buttons 91 and 92. Contact 86b of limit switch 86 of course has been closed. A similar action takes place when the temperature-sensing device 19a is retracted and 19b projected. In each instance recorder 35 has a stabilized reading before the A.-C. connection is made thereto.

*Computing components*

As shown in FIGURE 4, circuit 26, which computes the thermal diffusivity of the work at the temperature of its upper surface as it leaves the furnace ($\alpha$ in the first formula), includes four components 101–103. Signal $T_1$ from the temperature-sensing device 18 goes to both components 100 and 101, which are "function generators." Components 100 and 101 develop output voltage signals proportional to the conductivity $K(T_1)$ and the specific heat $C(T_1)$ respectively. Signal $K(T_1)$ from component 100 goes to component 102, which multiplies it by the reciprocal of the density of the work and thus develops a voltage output signal proportional to Signals
$$\frac{K(T_1)}{\rho}$$

$$\frac{K(T_1)}{\rho}$$

and $C(T_1)$ from components 101 and 102 go to component 103, which divides the former signal by the latter, and thus develops a voltage output signal proportional to $$\frac{K(T_1)}{\rho C(T_1)}$$

the thermal diffusivity.

Circuit 27, which computes the velocity of the work through the furnace (V in the first formula), includes two components 104 and 105. Signals $b$ (slab width) and $p$ (period) from indicators 31 and 32 go to component 104, which divides the former signal by the latter and thus develops a voltage output signal proportional to $b/p$. Signal $b/p$ from component 104 goes to component 105, which multiplies it by 60 and thus develops a voltage output signal proportional to $60b/p$, the velocity in feet per hour.

Circuit 28, which computes the temperature rise along the upper surface of the work ($h$ in the first formula) includes the aforementioned selector switch 58 and four components 106, 107, 107a and 107b. Signals $T_1$ from the temperature-sensing device 18 and $T_2$ from the temperature-sensing device 19, 19a or 19b, go to component 106, which subtracts the latter signal from the former and thus develops a voltage output signal proportional to $(T_1-T_2)$. Signal $(T_1-T_2)$ from component 106 goes to component 107, 107a, or 107b, which are set to multiply this signal by the reciprocal of the distances $X_{1-2}$, $X_{1-3}$ or $X_{1-4}$ respectively. The selector switch 58 is mechanically connected with the recorder drive 42 to cut in the appropriate component 107, 107a or 107b, depending on which temperature-sensing device 19, 19a or 19b is acting at the moment. Thus the component which is cut in develops an output voltage signal proportional to $$\frac{(T_1-T_2)}{x}$$

the temperature rise in degrees F. per foot.

Circuit 29, which computes the temperature difference between the upper and lower surfaces of the work ($\Delta\theta_y$), includes a single component 108. Signals $T_1$ and $T_5$ from the temperature-sensing devices 18 and 17 respectively go to component 108, which subtracts the latter from the former and thus develops a voltage output signal proportional to $(T_1-T_5)$.

Circuit 30, which combines the signals from the other circuits, includes ten components 112–121. Signal S (slab thickness) from set point indicator 34 goes to component 112 which squares it and thus develops a voltage signal proportional to $S^2$. Signals V (slab velocity) from circuit 27 and $S^2$ from component 112 go to component 113, which multiplies them and thus develops an output voltage signal proportional to $VS^2$. Signals $h$ (temperature rise per foot) from circuit 28 and $VS^2$ from component 113 go to component 114, which multiplies them and thus develops an output voltage signal proportional to $VS^2h$. Signals $\alpha$ (thermal diffusivity) from circuit 26 and $(T_1-T_5)$ from circuit 29 go to component 115, which multiplies them and thus develops an output voltage signal proportional to $\alpha\Delta\theta_y$. Signals $\alpha\Delta\theta_y$ from component 115 and $VS^2h$ from component 114 go to component 116, which divides the former by the latter and thus develops an output voltage signal proportional to $$\frac{\alpha\Delta\theta_y}{VS^2h}$$

The last-named signal goes from component 116 to component 117 which adds a constant 0.5. The resulting voltage signal goes from component 117 to component 118, which squares it and thus develops an output voltage signal proportional to $$\left[\frac{\alpha\Delta\theta_y}{VS^2h}+0.5\right]^2$$

Signals $VS^2$ from component 113 goes to component 119 which multiplies it by a constant 0.3 and thus develops an output signal proportional to $0.3VS^2$. The last-named signal from component 119 and signal $\alpha$ from circuit 26 go to component 120 which divides the former by the latter and thus develops a voltage output signal proportional to $$0.3\frac{VS^2}{\alpha}$$

The two signals from components 118 and 120 go to component 121, which multiplies them and thus develops a signal proportional to $Xi$. The signal $Xi$ goes from circuit 30 to recorder 35.

Circuit 36, which computes the maximum temperature difference in the work ($\Delta\theta_{max}$ in the second formula) includes a single component 122. Signal $(T_1-T_2)$ from component 106 of circuit 28 goes to component 122, which multiplies it by a constant 1.67 and thus develops a voltage output signal proportional to $\Delta\theta_{max}$. This last signal goes to recorder 37. As already explained, this action takes place only after $Xi$ has been determined and relay 80 (FIGURE 3) has been energized.

The circuit components per se are known devices and are available commercially; hence I have not shown nor described them in detail. For one showing of examples of suitable components, reference can be made to a printed publication by George A. Philbrick Researches Inc., Boston, Mass., entitled "Catalog and Manual on GAP/R High Speed All-Electronic Analog Computors for Research and Design" copyright 1951. This publication shows a function generator "K4–FG" suitable for my components 100 and 101, a multiplying component "K4–MU" suitable for my components 103, 104, 113, 114, 115, 116, 120, and 121, an adding component "K3–A" suitable for my components 106, 108 and 117, a squaring component "K3–S" suitable for my components 112 and 118, and a coefficient component "K3–C" suitable for my components 102, 105, 107, 107a, 107b, 119 and 122.

From the foregoing description it is seen that my invention affords a practical and relatively simple apparatus for automatically determining the maximum temperature difference within workpieces in a furnace. The apparatus can readily be installed on existing equipment, and improves the efficiency in allowing the equipment to be operated at the maximum rate which does not create an excessive temperature difference.

While I have shown and described only a single embodiment of my invention, it is apparent that modifications may arise. Therefore, I do not wish to be limited to the disclosure set forth but only by the scope of the appended claims.

I claim:

1. An apparatus for determining the difference in temperature between a first point on the surface of a body heated to an elevated temperature and a second point in the body inaccessible beneath the surface, said apparatus comprising means for measuring the temperature of the body at the first point, means for measuring the temperature of the body at a plurality of finite points on its surface spaced at different distances from the first point, computing means operatively connected with said temperature-measuring means for generating a first signal representative of a linear distance starting at the first point and extending along the surface of the body over which distance the temperature variation bears approximately a direct relation to the temperature variation between the first and second points, means for selecting from the finite points the point which is spaced from the first point by a distance most nearly approximating the distance represented by said first signal but being at least as great as this distance, and means operatively connected with said temperature-measuring means for utilizing the temperature measurements at the first point and the selected finite point to generate a second signal proportional to the difference in temperature between the first and second points.

2. An apparatus for determining the difference in temperature between a first point on the upper surface of a moving body to an elevated temperature and a second point in the body inaccesible beneath the upper surface, the first and second points being the points of maximum and minimum temperature respectively of the body, said apparatus comprising means for measuring the temperature of the body at the first point, means for measuring the temperature of the body at a plurality of finite points on its upper surface spaced at different linear distances from the first point, computing means operatively connected with said temperature-measuring means for generating a first signal representative of a linear distance starting at the first point and extending along the upper surface of the body over which distance the temperature variation bears approximately a direct relation to the temperature variaiton between the first and second points, means for selecting from the finite points the point which is spaced from the first point by a distance most nearly approximating the distance represented by said first signal but being at least as great as this distance, and means operatively connected with said temperature-measuring means for utilizing the temperature measurements at the first point and the selected finite point to generate a second signal proportional to the difference in temperature between the first and second points.

3. An apparatus as defined in claim 2 which includes means for measuring the temperature of the lower surface of the body opposite the first point, and in which said computing means generates said first signal by solving the formula:

$$Xi = 0.3 \frac{VS^2}{\alpha} \left[ \frac{\alpha \Delta \theta_y}{VS^2 h} + 0.5 \right]^2$$

in which:

$Xi$ = the distance on the surface,
$V$ = the velocity of the body,
$\alpha$ = the thermal diffusivity of the body,
$S$ = the thickness of the body,
$\Delta \theta_y$ = the difference in temperature between the first point and the opposite point on the lower surface, and
$h$ = the temperature rise along the upper surface of the body.

4. An apparatus as defined in claim 2 in which said second signal is generated by solving the formula:

$$\Delta \theta_{max} = 1.67 \ (T_1 - T_2)$$

in which:

$\Delta \theta_{max}$ = the temperature difference
$T_1$ = the temperature at the first point; and
$T_2$ = the temperature at the selected finite point.

5. The combination, with a continuous reheating furnace for metal workpieces which includes a hearth adapted to support a row of workpieces in contact with one another and moving therealong, of an apparatus for determining the difference in temperature between a first point on the upper surface of a workpiece at the discharge end of the furnace and a second point in the workpiece inaccessible beneath the upper surface, the first and second points being the points of maximum and minimum temperature respectively in the workpiece, said apparatus comprising means for measuring the temperature of the workpiece at the first point, means for measuring the temperature of the upper surface of the row of workpieces at a plurality of finite points spaced at different linear distances from the first point, computing means operatively connected with said temperature-measuring means for generating a first signal representative of a linear distance starting at the first point and extending along the upper surface of the row of workpieces over which distance the temperature variation bears approximately a direct relation to the temperature variation between the first and second points, means for selecting from the finite points the point which is spaced from the first point by a distance most nearly approximating the distance represented by said first signal but being at least as great as this distance, and means operatively connected with said temperature-measuring means for utilizing the temperature measurements at the first point and the selected finite point to generate a second signal proportional to the difference in temperature between the first and second points.

6. A combination as defined in claim 5 which includes means for measuring the temperature of the lower surface of the workpiece opposite the first point and in which said computing means generates said first signal by solving the formula:

$$Xi = 0.3 \frac{VS^2}{\alpha} \left[ \frac{\alpha \Delta \theta_y}{VS^2 h} + 0.5 \right]^2$$

in which:

$Xi$ = the distance on the surface,
$V$ = the velocity of the workpieces,
$\alpha$ = the thermal diffusivity of the workpieces,
$S$ = the thickness of the workpieces,
$\Delta \theta_y$ = the difference in temperature between the first point and the opposite point on the lower surface, and
$h$ = the temperature rise along the upper surface of the row of workpieces.

7. An apparatus as defined in claim 5 in which said second signal is generated by solving the formula:

$$\Delta \theta_{max} = 1.67 \ (T_1 - T_2)$$

in which:

$\Delta \theta_{max}$ = the temperature difference
$T_1$ = the temperature at the first point, and
$T_2$ = the temperature at the selected finite point.

8. The combination, with a continuous reheating furnace for metal workpieces which includes a hearth adapted to support a row of workpieces in contact with one another and moving therealong, of an apparatus for determining the difference in temperature between a first point on the upper surface of a workpiece at the discharge end of the furnace and a second point in the workpiece inaccessible beneath the upper surface, the first and second points being the points of maximum and minimum temperature respectively in the workpiece, said apparatus comprising a temperature-sensing device located over the first point, a plurality of other temperature-sensing devices located over finite points on the upper surface of the row of workpieces spaced at different linear distances from the first point, drive means operatively connected with said devices for projecting them into the furnace in positions to measure the temperature of adjacent points on the surface of the workpieces and for withdrawing said devices, computing means operatively connected with said devices for generating a first signal representative of a linear distance starting at the first point and extending along the upper surface of the row of workpieces over which distance the temperature variation bears approximately a direct relation to the temperature variation between the first and second points, means for selecting from said plurality of devices the device which is spaced from the first point by a distance most nearly approximating the distance represented by said first signal but being at least as great as this distance, and means operatively connected with said devices for utilizing the temperature measurements at the first point and the point adjacent the selected device to generate a second signal proportional to the difference in temperature between the first and second points.

9. The combination, with a continuous reheating furnace for metal workpieces which includes a hearth adapted to support a row of workpieces in contact with one another and moving therealong, of an apparatus for determining the difference in temperature between a first point on the upper surface of a workpiece at the discharge end of the furnace and a second point in the workpiece inaccessible beneath the upper surface, the first and second points being the points of maximum and minimum temperature respectively in the workpiece, said apparatus comprising a temperature-sensing device located over the first point, a temperature-sensing device located under a point on the lower surface of the workpiece opposite the first point, a plurality of other temperature-sensing devices located over finite points on the upper surface of the row of workpieces spaced at different linear distances from the first point, drive means operatively connected with said devices for projecting them into the furnace in positions to measure the temperature of adjacent points on the surfaces of the workpieces and for withdrawing said devices, computing circuits operatively connected with said devices for generating a first signal representative of a linear distance starting at the first point and extending along the upper surface of the row of workpieces over which distance the temperature variation bears approximately a direct relation to the temperature variation between the first and second points, means in said computing circuits for selecting from said plurality of devices the device which is spaced from the first point by a distance most nearly approximating the distance represented by said first signal but being at least as great as this distance, and a computing circuit operatively connected with said devices for utilizing the temperature measurements at the first point and the point adjacent the selected device to generate a second signal proportional to the difference in temperature between the first and second points.

10. The combination, with a continuous reheating furnace for metal workpieces which includes a hearth adapted to support a row of workpieces in contact with one another and moving therealong, of an apparatus for determining the difference in temperature between a first point on the upper surface of a workpiece at the discharge end of the furnace and a second point in the workpiece inaccessible beneath the upper surface, the first and second points being the points of maximum and minimum temperature respectively in the workpiece, said apparatus comprising a temperature-sensing device located over the first point, a temperature-sensing device located under a point on the lower surface of the workpiece opposite the first point, a plurality of other temperature-sensing devices located over finite points on the upper surface of the row of workpieces spaced at different linear distances from the first point, drive means operatively connected with said first and second-named devices for projecting them into the furnace and withdrawing them, additional drive means operatively connected with said plurality of devices for projecting them one at a time and in sequence into the furnace and withdrawing them, said devices when projected measuring the temperature of adjacent points on the surfaces of the workpiece, computing circuits operatively connected with said devices for generating a first signal representative of a linear distance starting at the first point and extending along the upper surface of the row of workpieces over which distance the temperature variation bears approximately a direct relation to the temperature variation between the first and second points, means in said computing circuits for selecting from said plurality of devices the device which is spaced from the first point by a distance most nearly approximating the distance represented by said first signal but being at least as great as this distance, and a computing circuit operatively connected with said devices for utilizing the temperature measurements at the first point and the point adjacent the selected device to generate a second signal proportional to the difference in temperature between the first and second points.

References Cited by the Examiner

UNITED STATES PATENTS

| | | | |
|---|---|---|---|
| 1,534,874 | 4/1925 | Scott | 148—128 |
| 2,578,890 | 12/1951 | Ledin | 73—341 |
| 2,907,209 | 10/1959 | Wack | 73—341 |

FOREIGN PATENTS

| | | |
|---|---|---|
| 946,574 | 8/1956 | Germany. |

MALCOLM A. MORRISON, *Primary Examiner.*